United States Patent
Ulenaers et al.

(10) Patent No.: US 6,744,207 B2
(45) Date of Patent: Jun. 1, 2004

(54) LEAD-FREE AMBER-COLORED ELECTRIC LAMP

(75) Inventors: Hubertina Maria Petra Ulenaers, Eindhoven (NL); Cornelis Jacob Van De Velde, Weert (NL); Simon Krijnen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 55 days.

(21) Appl. No.: 10/011,988

(22) Filed: Dec. 4, 2001

(65) Prior Publication Data
US 2002/0117950 A1 Aug. 29, 2002

(30) Foreign Application Priority Data

| Dec. 5, 2000 | (EP) | ............................................. 00403407 |
| Mar. 15, 2001 | (EP) | ............................................. 01200976 |
| Jul. 10, 2001 | (EP) | ............................................. 0120640 |

(51) Int. Cl.⁷ .......................... H01J 17/16; H01J 61/35
(52) U.S. Cl. ........................................ 313/636; 313/493
(58) Field of Search ................................ 501/66, 68, 4, 501/11, 53, 135, 69; 313/636, 112

(56) References Cited

U.S. PATENT DOCUMENTS

| 4,336,303 A | * | 6/1982 | Rittler | ........................ 428/334 |
| 4,665,039 A | * | 5/1987 | Kokubu et al. | ................ 501/39 |
| 5,258,336 A | * | 11/1993 | LaMastro et al. | .............. 501/66 |
| 5,322,819 A | * | 6/1994 | Araujo et al. | .................. 501/13 |
| 5,372,985 A | * | 12/1994 | Chang et al. | ................ 503/201 |
| 5,470,805 A | | 11/1995 | Filmer | .......................... 501/55 |
| 5,633,090 A | * | 5/1997 | Rodek et al. | ............... 428/428 |
| 5,932,501 A | * | 8/1999 | Brocheton | .................... 501/64 |
| 2002/0042338 A1 | * | 4/2002 | Oyama et al. | ................. 501/72 |

FOREIGN PATENT DOCUMENTS

| EP | 0603933 B1 | 6/1994 | ........... C03C/3/087 |
| JP | 2000203871 A | * 7/2000 | ........... C03C/3/085 |
| JP | 2000315477 A | * 11/2000 | ........... H01J/61/30 |

OTHER PUBLICATIONS

English astracts of Japenese Patent (JP2000–203871).*
English astracts of Japenese Patent (JP2000–315477).*

* cited by examiner

*Primary Examiner*—Nimeshkumar D. Patel
*Assistant Examiner*—Anthony Perry

(57) ABSTRACT

The invention relates to electric lamps and more particularly to automotive signal lamps. Lead-free, cadmium-free, sulfate-refined glass compositions are described for use in electric lamps, which glass is amber colored and comprises no toxic or forbidden components which could be harmful to the environment such as lead oxide, antimony oxide, selenium or cadmium.

7 Claims, 1 Drawing Sheet

LEAD-FREE AMBER-COLORED ELECTRIC LAMP

BACKGROUND OF INVENTION

1. Field of the Invention

The invention relates to electric lamps. The invention in particular relates to an electric lamp having a glass envelope, the wall of the glass being amber colored.

The invention applies to incandescent lamps and more particularly to automotive signal lamps, e.g. indicator lamps.

2. Description of Related Art

U.S. Pat. No. 5,470,805 describes a lead-free glass composition for use in electric lamps.

BRIEF SUMMARY OF THE INVENTION

It is an object of the invention to provide an electric lamp having a glass envelope, the wall of the glass being amber colored and the glass composition being lead-free.

It is a further object of the invention to provide an electric lamp having a glass envelope, the wall of the glass envelope being amber colored and the glass composition comprising no toxic or forbidden component which could be harmful to the environment such as lead oxide, antimony oxide, selenium or cadmium. In Europe the use of cadmium is restricted to automotive lamps.

According to the invention, these objects are achieved by an electric lamp as mentioned in the opening paragraph the glass composition of the wall comprising up to 1% by weight molybdenum in oxidic form and up to 2.5% by weight $SO_3$.

The electric lamp has a wall of the glass having a lead-free, cadmium-free, sulfate-refined glass composition comprising molybdenum oxide and $SO_3$.

Advantages of the electric lamp according to the invention relate to the following aspects. The glass in prior-art colored lamps, such as automotive signal lamps. usually contains a colored varnish or lacquer. A disadvantage of the prior-art lamps is that the lacquer or varnish may degrade and eventually became detached from the wall of the lamp envelope. Another disadvantage of the prior-art lamps is that additional steps are necessary during the manufacturing process of the lamp to clean and varnish the lamp envelope. The manufacturing cost is increased by these additional steps.

During the production of an electric lamp according to the invention, no additional manufacturing step is necessary since the specific color point of the glass envelope is realized by the particular composition of the glass. At least the steps of cleaning and varnishing are rendered superfluous. Due to its specific composition, the glass may have an amber or orange color point suitable for automotive signal lamps, as defined by international traffic regulations.

Moreover, the colored glass obtained by using this glass composition yields a higher-quality glass, since the amber or orange obtained color due to the glass composition stays forever, which may not be the case of varnished glasses.

The invention and additional features, which may be optionally used to implement the invention, are apparent from and will be elucidated with reference to the embodiments described hereinafter.

DETAILED DESCRIPTION OF THE INVENTION

Figure 1:
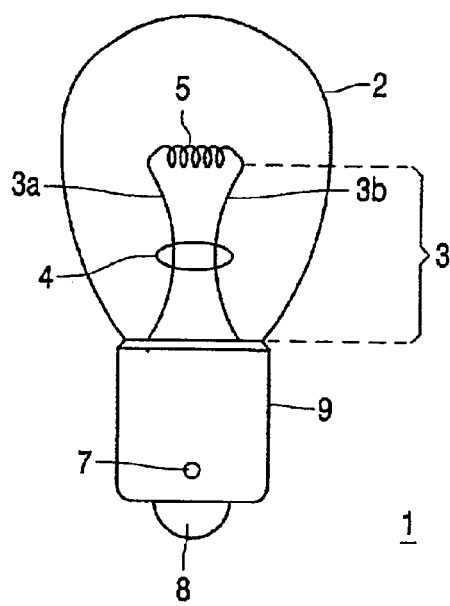
FIG. 1 shows a schematic chart illustrating an example of an electric lamp according to the invention.

FIG. 1 shows an electric automotive signal lamp 1 also called indicator lamp comprising:

- a lamp envelope or bulb 2 made of amber colored glass, having a wall thickness between, for example, 0.3 mm and 1.1 mm,
- a mount 3, comprising two lead wires 3a and 3b held by a bead 4 mounted inside the glass bulb 2 for supporting a coiled filament 5,
- an exhaust tube 7, heated and sealed up with the mount 3 and the bulb 2, thereby forming a vacuum-tight pinch for exhausting gasses from the lamp envelope 2 and for introducing inert gas into the lamp envelope during the manufacturing process of the lamp,
- an electric contact 8 connected to the mount 3 enabling the lamp to be energized by the electric circuits of the car,
- a metal cap 9 to fit in a holder of the lamp set.

According to the invention, the bulb 2 of the lamp is made of a lead-free, cadmium-free, amber-colored sulfite-refined glass.

As described in the cited U.S. Pat. No. 5,470,805, the staring materials used are quartz sand, spodumene, dolomite and the carbonates of Li, Na, K, Sr and Ba. Sodium sulfate ($Na_2SO_4$) may be used as a refining agent.

An electric lamp in accordance with a preferred, first embodiment of the invention, has a glass bulb of a glass composition comprising the constituents as listed in Table 1.

TABLE 1

Glass composition according to a first embodiment of the invention.

| Constituent | Composition (% by weight) |
| --- | --- |
| $SiO_2$ | 60–75 |
| $Al_2O_3$ | 0.1–7 |
| $Li_2O$ | 0.1–2.5 |
| $Na_2O$ | 5–12 |
| $K_2O$ | 2–9 |
| MgO | 0.1–3 |
| CaO | 0.1–5 |
| SrO | 0.1–10 |
| BaO | 5–15 |
| $MoO_3$ | 0.01–1 |
| $SO_3$ | 0.25–2.5 |

$SiO_2$ serves as a network former in the glass. The $SiO_2$ content is limited to 60–75% by weight, leading in combination with the other constituents to a readily meltable glass. $Al_2O_3$ improves the chemical resistance and the corrosion resistance of the glass. The alkaline metal oxides $Li_2O$, $Na_2O$ and $K_2O$ are used as a melting agent and reduce the viscosity of the glass. If all three alkaline metal oxides are used in the given composition, the electric resistance is sufficiently high (mixed-alkali effect). BaO has the favorable property that it increases the electric resistance of the glass and reduces the softening temperature of the glass ($T_{soft}$). The alkaline-earth metal-oxides SrO, MgO and CaO have the favorable property that they reduce the liquefying temperature and the melting temperature of the glass.

The lead-free, cadmium-free, amber-colored sulfate-refined glass with a composition according to Table 1 has been refined with $Na_2SO_4$ and preferably comprises 0.25–2.5% by weight of $SO_3$. The glass may additionally contain some $Fe_3O_3$ as an impurity originating from the raw materials used.

Compared to the lead-free stem glass of the known electric lamp, the amber or orange colored glass according to the invention is obtained by adding up to 1% by weight of $MoO_3$ and a reducing agent, e.g. carbon or charcoal, to the glass composition and a higher amount of refining agent, e.g. sulfate, to the reducing atmosphere, so that the glass composition may comprise up to 2.5% by weight of $SO_3$. The reducing atmosphere is caused by the presence of the reducing agent. $MoO_3$ dissolved in glass reduces the transmission in particular in the 290–380 nm region. In the presence of sulfur $MoO_3$ colors silicate glasses orange which is explained by the possible formation of thiomolybdate. The solubility of $MoO_3$ in glass is relatively poor.

An electric lamp in accordance with a more preferred first embodiment of the invention, has a glass bulb of a glass composition comprising the constituents as listed in Table 2.

TABLE 2

Glass composition according to a preferred first embodiment of the invention.

| Constituent | Composition (% by weight) |
| --- | --- |
| $SiO_2$ | 60–72 |
| $Al_2O_3$ | 1–7 |
| $Li_2O$ | 0.5–2.5 |
| $Na_2O$ | 5–12 |
| $K_2O$ | 2–9 |
| MgO | 1–3 |
| CaO | 1–5 |
| SrO | 1–10 |
| BaO | 5–15 |
| $MoO_3$ | 0.025–0.5 |
| $SO_3$ | 0.25–2.5 |
| $B_2O_3$ | 0–3 |
| $Fe_2O_3$ | 0–0.5 |
| $CeO_2$ | 0–0.2 |

With respect to the elements whose weight percentage has a lower limit equal to zero, it is to be noted that these elements may not be added as raw material but can still be present in the finished glass as a result of contamination of the raw materials.

The glasses made with the constituents as listed in Table 2 have characteristics as shown in Table 3.

TABLE 3

Physical properties of the glasses with a composition according to the first embodiment of the invention according to the invention.

| Physical property | Value |
| --- | --- |
| $T_{strain}$ | 455° C. |
| $T_{anneal}$ | 490° C. |
| $T_{soft}$ | 675° C. |
| $T_{melt}$ | 1490° C. |
| Specific mass | $2.62 \times 10^3$ kg · m$^3$ |
| Specific resistance | $7.9 \times 10^6$ Ohm · m |
| Linear expansion coefficient (25–300° C.) | $9.1 \times 10^{-6}$/° C. |

An electric lamp in accordance with a preferred, second embodiment of the invention, has a glass bulb with a glass composition comprising the constituents as listed in Table 4.

TABLE 4

Glass composition according to a second embodiment of the invention.

| Constituent | Composition (% by weight) |
| --- | --- |
| $SiO_2$ | 70–75 |
| $Al_2O_3$ | 1–3 |
| $Na_2O$ | 15–20 |
| $K_2O$ | 0–2 |
| MgO | 1–5 |
| CaO | 1–7 |
| $MoO_3$ | 0.01–0.5 |
| $SO_3$ | 0.1–2.5 |

Glasses with the constituents as listed in Table 4 are relatively cheap glasses as compared to the glasses with constituents as listed in Table 1 and Table 2. $K_2O$ may be absent in the glasses as listed in Table 4. Abandoning the relative expensive constituents which are responsible for the high electric resistivity of the first embodiment results in a significant cheaper glass. This is a type of glass usually referred to as soda lime glass.

The glasses made with the constituents as listed in Table 4 have characteristics as shown in Table 5.

TABLE 5

Physical properties of the glasses with a composition according to the second embodiment of the invention.

| Physical property | Value |
| --- | --- |
| $T_{strain}$ | 490° C. |
| $T_{anneal}$ | 520° C. |
| $T_{soft}$ | 690° C. |
| $T_{melt}$ | 1445° C. |
| Specific mass | $2.48 \times 10^3$ kg · m$^3$ |
| Specific resistance | $2.5 \times 10^6$ Ohm · m |
| Linear expansion coefficient (25–300° C.) | $9.7 \times 10^{-6}$/° C. |

The glass making process is described hereinafter. A batch is prepared by weighing and mixing all oxidic components mentioned above. The batch is fed to a conventional continuous melting tank. Adjustments to the recipe can be made by adding separate ingredients to the feeding system to enhance the coloration. The melting conditions, including temperature and gas atmosphere, are adjusted to obtain stable processing conditions for melting, refining and color stabilization. Preferably, $Na_2SO_4$ is used as a refining agent. The refining process takes place by formation of oxygen from the $SO_4$ component. In series of complex reactions, the excess gasses, including $CO_2$ and $N_2$, are removed from the glass melt to avoid air lines in the tubes formed. The atmosphere in the furnace is oxidized by the refining process. Preferably, the refining agent is partly built in the glass as a polysulfide and $SO_3$. The rest is carried off in the flue gasses. Glass tubes are made at the end of the glass manufacturing process using the well-known Danner process in the factory. However, the well-known Vello process could also be applied. Part of the tube is heated to make lamp bulbs.

Certain amounts of sulfur render the melt liable to turn yellow or brown. Sulfur occurs mostly in glass in polysulfide or sulfide form under reducing conditions. Amber glasses require an amount of a reducing agent, such as for example carbon or charcoal, to reduce sulfate to sulfide and polysulfide. But any other reducing agent could be used including Cr, Mn, V, etc The yellow color of amber glasses is caused by alkaline polysulfides, together with sulfides of heavy metals, particularly Fe. The formation of $S^{2-}$ which is incorporated by the $Fe_2O_3$ chromophore causes the amber or orange color. In combination with charcoal as reducing agent, the formation of $Fe^{2+}$ takes place. Only traces of $Fe_2O_3$, in combination with sulfur under heavy reducing conditions, where $Fe^{2+}$ and $Fe^{3+}$ are formed (mostly as $Fe^{2+}$), can cause the amber color. $Fe_2O_3$ does not necessarily have to be added to the recipe of the glass composition. As already indicated above, the amount of Fe may be obtained by the raw materials that are used.

Not wishing to be held to any particular theory, the coloring of the glasses can be explained by the formation of a chromophore, which is composed of a central atom of $Fe^{3+}$, surrounded by three oxygen atoms in a tetrahedral co-ordination. In the chromophore the S can only be bound to the $Fe^{3+}$-atom or by bridging to $Fe^{3+}$ and $Si^{4+}$. The dependence of the coloring of amber glass on the amount of alkalis has been demonstrated. The more alkaline the glass, the deeper and darker the coloring is and the absorption shifts towards longer wavelengths. The formation of higher polysulfides occurs more readily as the ionic radius of the monovalent alkali metals is larger. The higher the form of the polysulfide and the longer the S-chain, the redder and more intense the color is. $K_2O$ improves and intensifies the color of amber glass.

The Na-sulfoferrate complex $NaFeS_2$ is characterized by an intense red color. The concentration of sulfoferrates decreases with increasing acidity of the glass. In acidic glasses most of the polysulfides are decomposed to $H_2S$ and S and the color turns dirty green. At elevated temperatures, water also exhibits an acidic effect, which leads to hydrolytic decomposition of polysulfides.

In the presence of molybdenum silicate glass colors orange which is explained by the formation of thiomolybdate. In particular, molybdenum oxide reduces the transmission in particular in the region 290–380 nm.

When melting amber glasses it is necessary to prevent the formation of FeS. The yellow coloring is dependent on the thermal history of the glass. The transmission curve shows absorption in the UV and blue regions up to 500 nm, whereas the yellow, red and infrared are transmitted unhindered. The intensity of orange to red amber colors requires the presence of small mounts of Fe.

Figure 2:
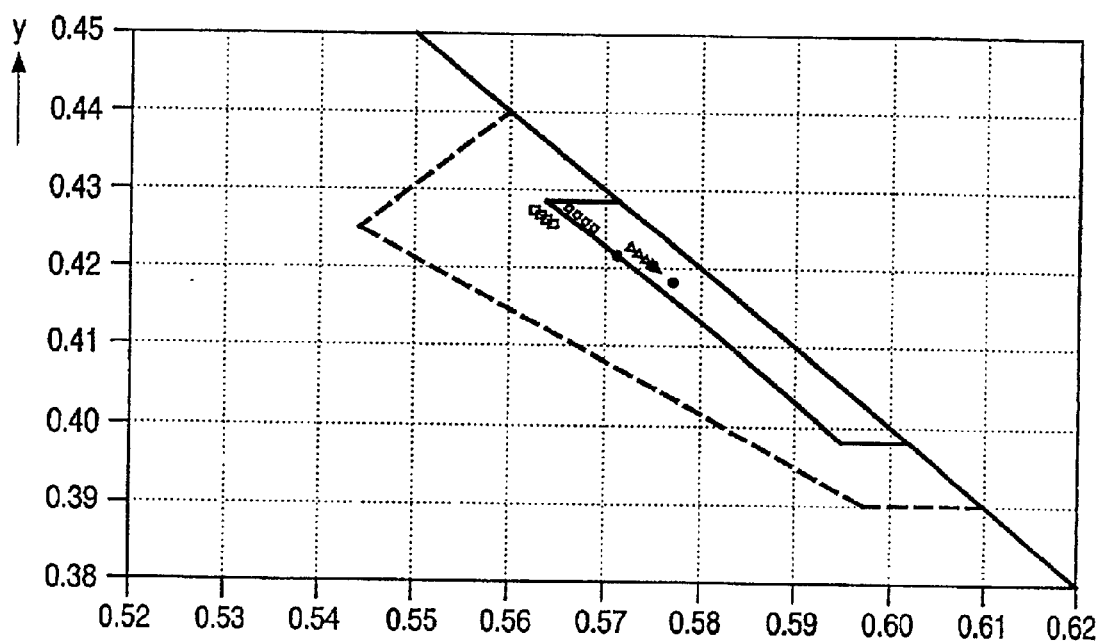
FIG. 2 shows a chromaticity diagram showing the characteristics in the color triangle of amber or orange colored glasses according to the invention.

FIG. 2 shows a variety of color points of amber colored glass for use in the glass envelope of signal lamps according to international traffic regulations, with respect to X and Y co-ordinates in the chromaticity chart. These color points may be achieved with glass compositions in accordance with the invention described above. It is noted that the exact composition of the glass that gives the color point, depends on the production of the glass, particularly the reducing state, and on the curing after bulb blowing.

In Europe, an amber color point for automotive indicator lamps is defined by the ECE 37 regulation, known to the person skilled in the art. It corresponds to the area shown in bold continuous lines of FIG. 2. The amber ECE 37-region is determined by the following color coordinates (0.571, 0.429), (0.564, 0.429), (0.595, 0.398) and (0.602, 0.398).

The GTB (Groupe de Travail de Bruxelles) commission has proposed a new larger area which is expected within 2 or 3 years, shown by the dotted lines in FIG. 2. This larger area corresponds to the SAE (Society of Automotive Engineers) requirements. The color coordinates of the amber SAE-region are determined by (0.560, 0.440), (0.545, 0.425), (0.597, 0.390) and (0.610, 0.390).

Various batches of glass according to the first and second embodiments of the invention have been prepared. In FIG. 2 the triangles, lozenges and squares correspond with three different compositions of the glasses according to the first embodiment of the invention, the circles correspond with a glass with a composition according to the second embodiment of the invention.

In FIG. 2 the triangles are well within the ranges as defined by the ECE 37 regulation limits automotive indicator lamps. The lozenges are close to the edge of the ECE 37 region and the squares are just outside the preferred ECE 37 region but well within the SAE region. As compared to the other glasses, the composition of the glass corresponding to the color point represented by the triangles in FIG. 2 had a relatively low Fe content. The wall thickness of said glass was approximately 0.6 mm with a transmission in the range from 400 to 700 nm of approximately 60%.

In FIG. 2 the circles representing color points of glasses according to the second embodiment of the invention fulfill the requirements as defined by the ECE 37 regulation. The compositions of the glass represented by the circles in FIG. 2 have a Fe content less than 0.03% by weight.

The drawings and their description illustrate rather than limit the invention. It will be evident that there are numerous alternatives which fall within the scope of the appended claims. In this respect, the following closing remarks are made Any reference sign in a claim should not he construed as limiting the claim. The word "comprising" does not exclude the presence of elements or steps other than those listed in a claim. The word "a" or "an" preceding an element or step does not exclude the presence of a plurality of such elements or steps.

What is claimed is:

1. An electric lamp having a glass envelope, the walls of the glass being amber colored, the amber color being realized by a composition of the glass, the glass composition of the wall comprising 0.0000000001% up to 1% by weight molybdenum in oxidic form, and 0.0000000001% up to 2.5% by weight $SO_3$, wherein the glass composition is substantially free from lead, cadmium, antimony and selenium.

2. An electric lamp having a glass envelope of glass, the walls of the glass being amber colored, the amber color being realized by a composition of the glass, the glass composition being substantially free from lead, cadmium, antimony and selenium, the glass composition of the wall comprising molybdenum in oxidic form for 0.0000000001% up to 1% by weight, and the glass being refined using sulphate as a refining agent in a reducing atmosphere so that the glass composition contains 0.0000000001% up to 2.5% by weight $SO_3$.

3. An electric lamp as claimed in claim 1, wherein the glass composition, expressed in percentage by weight, comprises:

| | |
|---|---|
| $SiO_2$ | 60–75 |
| $Al_2O_3$ | 0.1–7 |
| $Li_2O$ | 0.1–2.5 |
| $Na_2O$ | 5–12 |
| $K_2O$ | 2–9 |
| MgO | 0.1–3 |

-continued

| | |
|---|---|
| CaO | 0.1–5 |
| SrO | 0.1–10 |
| BaO | 5–15 |
| MoO$_3$ | 0.01–1 |
| SO$_3$ | 0.25–2.5 |

4. An electric lamp as claimed in claim 1, wherein the glass composition, expressed in percent by weight, comprises:

| | |
|---|---|
| SiO$_2$ | 70–75 |
| Al$_2$O$_3$ | 1–3 |
| Na$_2$O | 15–20 |
| K$_2$O | 0–2 |
| MgO | 1–5 |

-continued

| | |
|---|---|
| CaO | 1–7 |
| MoO$_3$ | 0.01–0.5 |
| SO$_3$ | 0.1–2.5 |

5. An electric lamp as claimed in claim 1, wherein the glass composition comprises traces of B$_2$O$_3$ up to 3% by weight.

6. An electric lamp as claimed in claim 1, wherein the glass composition comprises traces of Fe$_2$O$_3$ up to 0.5% by weight.

7. An electric lamp as claimed in claim 1,
  wherein the glass composition comprises traces of CeO$_2$ up to 0.2% by weight.

* * * * *